(12) United States Patent
Benesty (10) Patent No.: US 6,694,020 B1
(45) Date of Patent: Feb. 17, 2004

(54) FREQUENCY DOMAIN STEREOPHONIC ACOUSTIC ECHO CANCELLER UTILIZING NON-LINEAR TRANSFORMATIONS

(75) Inventor: Jacob Benesty, Summit, NJ (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/395,834

(22) Filed: Sep. 14, 1999

(51) Int. Cl.$^7$ ................................................. H04M 9/08
(52) U.S. Cl. ........................... 379/406.12; 379/406.08; 379/406.11; 370/291; 375/233
(58) Field of Search ................. 379/406.08, 406.09, 379/406.01, 406.05, 406.11, 406.12, 406.13; 375/232, 233, 322, 323; 370/290, 291, 286; 381/66, 94.1, 71.1

(56) References Cited

U.S. PATENT DOCUMENTS

| | | | | |
|---|---|---|---|---|
| 5,272,695 A | * | 12/1993 | Makino et al. ............. | 370/291 |
| 5,323,459 A | * | 6/1994 | Hirano ....................... | 379/391 |
| 5,661,813 A | * | 8/1997 | Shimauchi et al. ........... | 381/66 |
| 5,663,955 A | * | 9/1997 | Iyengar ....................... | 370/291 |
| 5,721,772 A | * | 2/1998 | Haneda et al. ........... | 379/406.14 |
| 5,734,715 A | * | 3/1998 | Scalart et al. ............ | 379/406.08 |
| 5,761,318 A | * | 6/1998 | Shimauchi et al. ............ | 381/66 |
| 5,774,561 A | * | 6/1998 | Nakagawa et al. ............ | 381/66 |
| 5,818,945 A | * | 10/1998 | Makino et al. ................ | 381/66 |
| 5,828,756 A | | 10/1998 | Benesty et al. ................ | 381/66 |
| 5,889,857 A | * | 3/1999 | Boudy et al. ........... | 379/406.14 |
| 6,091,813 A | * | 7/2000 | Harley et al. ........... | 379/406.08 |
| 6,246,760 B1 | * | 6/2001 | Makino et al. .............. | 379/410 |
| 6,381,272 B1 | * | 4/2002 | Ali .............................. | 375/233 |

* cited by examiner

Primary Examiner—Binh Tieu
(74) Attorney, Agent, or Firm—Synnestvedt & Lechner LLP

(57) ABSTRACT

The invention is a multiple channel teleconferencing system employing a stereophonic acoustic echo canceler that exploits the coherence between multiple channels. In accordance with the invention a small non-linearity is incorporated into each channel path between the microphone and the speaker and an efficient frequency domain adaptive algorithm is implemented in the echo canceler circuit. The frequency domain algorithm converges to a solution much more quickly, than, for instance, a time domain, normalized least mean squares, solution.

25 Claims, 6 Drawing Sheets

FREQUENCY DOMAIN STEREOPHONIC ACOUSTIC ECHO CANCELLER UTILIZING NON-LINEAR TRANSFORMATIONS

FIELD OF THE INVENTION

The present invention relates to acoustic echo cancellation and more specifically to stereophonic acoustic echo cancellation.

BACKGROUND OF THE INVENTION

The evolution of teleconferencing to a more lifelike and transparent audio/video medium depends upon, among other things, the evolution of teleconferencing audio capabilities. The more realistic the sound, the more lifelike a teleconference will be and the more people and businesses will use it. Some present-day teleconferencing systems have already evolved to the point of including high-fidelity audio systems (100–7000 Hz bandwidth). These systems provide a significant improvement over older telephone systems (200–3200 Hz bandwidth). However, such high fidelity systems are by no means the limits of audio evolution in teleconferencing.

Spatial realism is highly desirable for audio/video teleconferencing. This is because of the need of a listener to follow, for example, a discussion among a panel of dynamic, multiple, and possibly simultaneous talkers. The need for spatial realism leads to consideration of multi-channel audio systems in teleconferencing, which, at a minimum, involves two channels (i.e., stereophonic).

Many present-day teleconferencing systems have a single (monophonic) full-duplex audio channel for voice communication. These systems, which range from simple speakerphones to modern video teleconferencing equipment, typically employ acoustic echo cancelers (AECs) to remove undesired echos that result from acoustic coupling. This coupling results when sound, emitted from the teleconference loudspeaker (in response to a signal from a remote location), arrives at the teleconference microphone in the same room. The microphone generates a signal in response to this sound (i.e., this echo). This microphone signal is then transmitted to the remote location. An AEC employs an adaptive filter to estimate the impulse response from the loudspeaker to the microphone in a room in which an echo occurs and to generate a signal which is subtracted from the receiver signal to cancel that echo electrically. Like monophonic teleconferencing, high-quality stereophonic teleconferencing requires AEC. (See, e.g., M. M. Sondhi and D. R. Morgan, "Acoustic echo cancellation for stereophonic teleconferencing," *Proc. IEEE ASSP Workshop Appls. Signal Processing Audio Acoustics*, 1991, which is incorporated herein by reference).

Stereophonic AEC presents a problem which does not exist in the monophonic context. In monophonic teleconferencing systems, a single adaptive filter is used to estimate a single impulse response from the loudspeaker to the microphone in the room experiencing an echo. There is only one impulse response to estimate because there is only one loudspeaker and one microphone in the room. As the adaptive filter impulse response estimate approaches the true impulse response of the room, the difference between these responses approaches zero. Once their difference is very small, the effects of echo are reduced. The ability to reduce echo is independent of the signal from the loudspeaker, since the real and estimated impulse responses are equal (or nearly so) and both the room (with its real impulse response) and the adaptive filter (with its estimated impulse response) are excited by the same signal.

In multi-channel stereophonic teleconferencing systems, multiple (e.g., two) adaptive filters are used to estimate the multiple (e.g., two) impulse responses of the room. Each adaptive filter is associated with a distinct acoustic path from a loudspeaker to a microphone in the receiving room. Rather than being able to independently estimate the individual impulse responses of the room, conventional stereophonic AEC systems derive impulse responses which have a combined effect of reducing echo. This limitation on independent response derivation is due to the fact that the AEC system can measure only a single signal per microphone. This signal is the sum of multiple acoustic signals arriving at a single microphone through multiple acoustic paths. Thus, the AEC cannot observe the individual impulse responses of the room. The problem with deriving impulse response estimates based on the combined effect of reduced echo is that such combined effect does not necessarily mean that the actual individual impulse responses are accurately estimated. When individual impulse responses are not accurately estimated, the ability of the AEC system to be robust to changes in the acoustic characteristics of the remote location is limited, commonly resulting in undesirable lapses in performance. (See, e.g., M. M. Sondhi, D. R. Morgan, and J. L. Hall, "Stereophonic Acoustic Echo Cancellation—An Overview of the Fundamental Problem," IEEE Signal Processing Lett., Vol. 2, No. 8, August 1995, pp. 148–151, which is incorporated herein by reference.)

Figure 1:
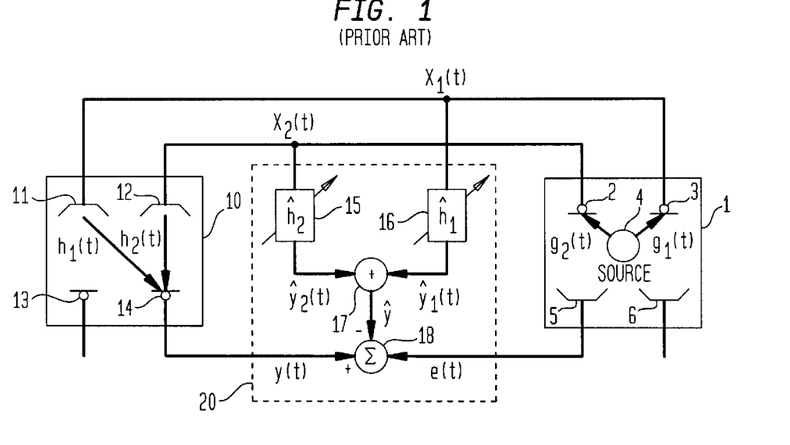
FIG. 1 is a schematic diagram of a conventional stereophonic teleconferencing system.

FIG. 1 presents a schematic diagram of a conventional stereophonic (two-channel) AEC system in the context of stereo teleconferencing between two locations. A transmission room 1 is depicted on the right of the figure. Transmission room 1 includes two microphones 2, 3 which are used to pick up signals from an acoustic source 4 (e.g., a speaking person) via two acoustic paths that are characterized by the impulse responses $g_1(t)$ and $g_2(t)$. (For clarity of presentation, all acoustic paths are assumed to include the corresponding loudspeaker and/or microphone responses.) Output from microphones 2, 3 are stereophonic channel source signals $x_2(t)$ and $x_1(t)$, respectively. These stereophonic channel source signals, $x_2(t)$ and $x_1(t)$, are then transmitted via a telecommunications network (such as a telephone or an ATM network) to loudspeakers 11, 12 in a receiving room 10 (shown on the left). For convenience, this direction will herein be termed the upstream direction and transmissions in the opposite direction, i.e., from room 10 to room 1, will be termed the downstream direction. The terms upstream and downstream are intended to have no particular connotation other than to differentiate between two directions. Loudspeakers 11, 12 are acoustically coupled to microphone 14 in receiving room 10 via the paths indicated with impulse responses $h_1(t)$ and $h_2(t)$. These are the paths by which acoustic echo signals arrive at microphone 14.

The output of the microphone 14 is signal y(t), which is a signal representing acoustic signals in the receiving room impinging on the microphone. These acoustic signals include the acoustic echo signals. Loudspeakers 11, 12 are also acoustically coupled to microphone 13 by other acoustic paths. For clarity of presentation, however, only the coupling to microphone 14 and AEC with respect to its output will be discussed.

Further, those of ordinary skill in the art will recognize that the analysis concerning AEC for the output of microphone 14 is applicable to the output of microphone 13 as well. Similarly, those skilled in the art will recognize that AEC as performed for the outputs of microphones 13 and 14 in receiving room 10 also may be advantageously performed for the outputs of microphones 2 and 3 in transmitting room 1, wherein the functions of receiving room 10 and transmitting room 1 are swapped.

If nothing were done to cancel the acoustic echo signals in receiving room 10, these echoes would pass back to loudspeaker 5 in transmission room 1 (via microphone 14 and the telecommunications network) and would be circulated repeatedly, producing undesirable multiple echoes, or even worse, howling instability. This, of course, is the reason that providing AEC capability is advantageous.

Conventional AECs typically derive an estimate of the echo with use of a finite impulse response (FIR) filter with adjustable coefficients. This "adaptable" filter models the acoustic impulse response of the echo path in the receiving room 10. FIG. 1 generally illustrates this technique with use of AEC 20 using two adaptive FIR filters 16, 15 having impulse responses, $\hat{h}_1(t)$ and $\hat{h}_2(t)$, respectively, to model the two echo paths in the receiving room 10. Filters 16, 15 may be located anywhere in the system (i.e., at the transmitting room 1, in the telecommunications network, or at the receiving room 10), but are preferably located at the receiving room 10.

Driving these filters 16, 15 with the upstream loudspeaker signals $x_1(t)$ and $x_2(t)$ produces signals $\hat{y}_1(t)$ and $\hat{y}_2(t)$, which are components of a total echo estimate. The sum of these two echo estimate component signals yields the total echo estimate signal, $\hat{y}(t)$, at the output of summing circuit 17. This echo estimate signal, $\hat{y}(t)$, is subtracted from the downstream signal $y(t)$ by subtraction circuit 18 to form an error signal $e(t)$. Error signal $e(t)$ is intended to be small (i.e., driven towards zero) in the absence of near-end speech (i.e., speech generated in the receiving room).

In most conventional AEC applications, the coefficients of adaptive filters 15, 16 are derived using well-known techniques, such as the LMS (or stochastic gradient) algorithm, familiar to those of ordinary skill in the art. The coefficients are updated in an effort to reduce the error signal to zero. As such, the coefficients $\hat{h}_1(t)$ and $\hat{h}_2(t)$ are a function of the stereophonic signals, $x_2(t)$ and $x_1(t)$, and the error signal, $e(t)$.

As mentioned above, unlike monophonic AECs, conventional stereophonic AECs do not independently estimate the individual impulse responses of a room. Rather, conventional stereophonic AEC systems derive impulse responses which have a combined effect of reducing echo. Unless individual impulse responses are accurately estimated, the ability of the AEC system to be robust to changes in the acoustic characteristics of the remote location is limited and undesirable lapses in performance may occur.

To see this problem in terms of the operation of the stereophonic teleconferencing system of FIG. 1, consider the following. The signal output from microphone 14 may be described as $$y(t)=h_1(t)*x_1(t)+h_2(t)*x_2(t),\quad\text{(Eq. 1)}$$

where $h_1$ and $h_2$ are the loudspeaker-to-microphone impulse responses in receiving room 10, $x_1$ and $x_2$ are stereophonic source signals provided to loudspeakers 11, 12, and "*" denotes convolution. (Sampled signals are assumed throughout so that the time index, t, is an integer.) The error signal, $e(t)$, may be written as $$e(t)=y(t)-\hat{h}_1^T x_1 - \hat{h}_2^T x_2,\quad\text{(Eq. 2a)}$$

where $\hat{h}_1$ and $\hat{h}_2$ are N-dimensional vectors of the adaptive filter coefficients and where $x_1=[x_1(t), x_1(t-1), \ldots x_1(t-N-1)]^T$ and $x_2=[x_2(t), x_2(t-1), \ldots x_2(t-N-1)]^T$ are vectors comprising the N most recent source signal samples, with superscript T denoting a transpose operation. The error signal can be written more compactly as $$e(t)=y(t)-\hat{h}^T x,\quad\text{(Eq. 2b)}$$

where $\hat{h}=[\hat{h}_1^T|\hat{h}_2^T]^T$ is the concatenation of $\hat{h}_1$ and $\hat{h}_2$, and likewise, $x=[x_1^T|x_2^T]^T$.

Assuming that N is large enough, the signal $y(t)$ can be written as $$y(t)=h_1^T x_1+h_2^T x_2=h^T x\quad\text{(Eq. 3)}$$

where $h_1$ and $h_2$ are the true impulse response vectors in the receiving room and where $h=[h_1^T|h_2^T]^T$. In terms of h, we may rewrite (Eq. 2b) as $$e(t)=(h-\hat{h})_T x = \tilde{h}^T x\quad\text{(Eq. 4)}$$

where $$\tilde{h}=\hat{h}-h\quad\text{(Eq. 5)}$$

is the impulse response misalignment vector.

Assume that $e(t)$ has been driven to be identically zero. From (Eq. 4), it follows that $$\tilde{h}_1*x_1+\tilde{h}_2*x_2 0.\quad\text{(Eq. 6)}$$

For the single-talker situation depicted in FIG. 1, for example, this further implies $$[\tilde{h}_1*g_1+\tilde{h}_2*g_2]* s(t)=0,\quad\text{(Eq. 7)}$$

where $s(t)$ is the acoustic signal generated by the talker in the transmission room. In the frequency domain, (Eq. 7) becomes $$[\tilde{H}_1(j\omega)G_1(j\omega)+\tilde{H}_2(j\omega)G_2(j\omega)]S(j\omega)=0,\quad\text{(Eq. 8)}$$

where the Fourier transforms of time functions are denoted by corresponding uppercase letters.

Consider first a single-channel situation, say $G_2=0$. In that case, except at zeroes of $G_1 S$, (Eq. 8) yields $\tilde{H}_1=0$. Thus, complete alignment (i.e., $\hat{h}_1=h$) is achieved by ensuring that $G_1 S$ does not vanish at any frequency. Of course, if the receiving room impulse response, $h_1$, changes, then the adaptation algorithm of adaptive filters 15, 16 must track these variations.

In the stereophonic situation, on the other hand, even if S has no zeroes in the frequency range of interest, the best that can be achieved is $$\tilde{H}_1 G_1+\tilde{H}_2 G_2=0.\quad\text{(Eq. 9)}$$

This equation does not imply that $\tilde{H}_1=\tilde{H}_2=0$, which is the condition of complete alignment. The problem with stereo echo cancelers is apparent from (Eq. 9): even if the receiving room impulse responses, $h_1$ and $h_2$, are fixed, any change in $G_1$ or $G_2$ requires adjustment of $\tilde{H}_1$ and $\tilde{H}_2$ (except in the special case where $\tilde{H}_1=\tilde{H}_2=0$). Thus, not only must the adaptation algorithm of filters 15, 16 track variations in the receiving room, it must also track variations in the transmission room. The latter variations are particularly difficult to track. For instance, if one talker stops talking and another starts talking at a different location in the room, the impulse responses, $g_1$ and $g_2$, change abruptly and by very large amounts.

J. Benesty, A. Gilloire, Y. Grenier, A frequency domain stereophonic acoustic echo canceller exploiting the coherence between the channels, *Acoustic Research Letters Online*, Jul. 21 1999, discloses a frequency domain algorithm for use in a stereophonic echo canceller that exploits the coherence between the channels.

As can be seen from the above discussion, therefore, the challenge is to devise an approach which (as in the case of a single-channel echo canceler) converges independently of variations in the transmission room. Also, note that if $x_1$ and $x_2$ in (Eq. 6) are uncorrelated, then (Eq. 6) implies that $\hat{h}_1 = \hat{h}_2 = 0$. For this reason, it is desirable to decorrelate $x_1$ and $X_2$.

Figure 2:
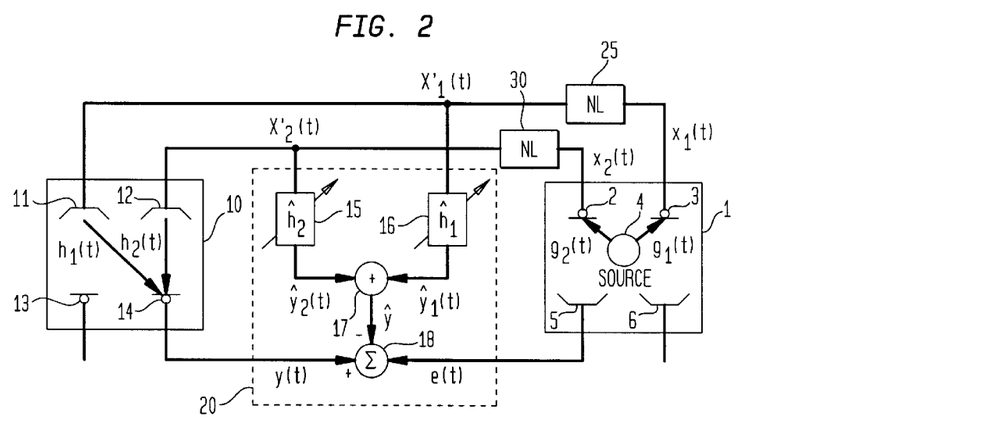
FIG. 2 is a schematic diagram of a prior art stereophonic teleconferencing system in which small non-linearities have been added into the channel paths in order to selectively reduce the correlation between the individual channel signals.

FIG. 2 is a schematic diagram of a stereophonic teleconferencing system that includes circuitry for decorrelations x and $x_2$ in accordance with the teachings of U.S. Pat. No. 5,828,756, incorporated herein by reference.

The system of FIG. 2 is identical to that of FIG. 1 except for the presence of non-linear signal transformation modules 25, 30 (NL), which have been inserted in the paths between microphones 3, 2 of transmission room 1 and loudspeakers 11, 12 of receiving room 10. By operation of non-linear transformation modules 25, 30, stereophonic source signals $x_1(t)$ and $x_2(t)$ are transformed to signals $x_1'(t)$ and $x_2'(t)$, respectively, where "'" indicates a transformed signal which (in this case) advantageously has a reduced correlation with the other transformed signal of the stereophonic system.

As with the system presented in FIG. 1, the filters of AEC 20 may be located anywhere within the system, but are preferably located at receiving room 10. Non-linear transformation modules 25, 30 also may be located anywhere (so long as receiving room 10 and AEC 20 both receive the transformed signals as shown), but are preferably located at transmitting room 1.

Specifically, in accordance with one embodiment of the device disclosed in U.S. Pat. No. 5,828,756, the signals $x_1(t)$ and $x_2(t)$ are advantageously partially decorrelated by adding to each a small non-linear function of the corresponding signal itself. It is well-known to those skilled in the art that the coherence magnitude between two processes is equal to one (1) if and only if they are linearly dependent. Therefore, by adding a "noise" component to each signal, the coherence is reduced. However, by combining the signal with an additive component which is similar to the original signal, the audible degradation may be advantageously minimized, as compared to the effect of adding, for example, a random noise component. This is particularly true for signals such as speech, where the harmonic structure of the signal tends to mask the distortion.

Figure 3:
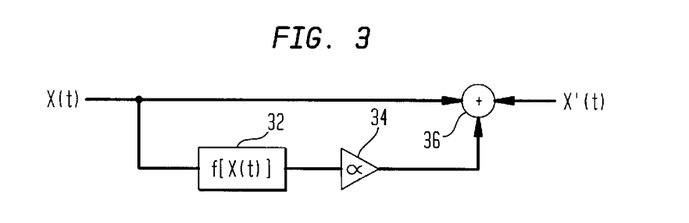
FIG. 3 is a schematic diagram of an illustrative non-linear signal transformation for use in the circuit of FIG. 2.

FIG. 3 presents a schematic diagram of an illustrative non-linear transformation module which may be used to implement non-linear transformation modules 25, 30 of the system of FIG. 2 in accordance with the teachings of U.S. Pat. No. 5,828,756. In the schematic shown in FIG. 3, non-linear function module 32 is applied to the original signal, x(t), and the result is multiplied by a (small) factor, α, with use of multiplier 34. The result is combined with the original signal, x(t), to produced the transformed signal, x'(t), as shown. In other words, for i=1, 2, $$x_i'(t) = x_i(t) + \alpha f_i[x_i(t)],\qquad\text{(Eq. 10)}$$

where functions $f_1$ and $f_2$ are advantageously non-linear. Thus, a linear relation between $x_1'(t)$ and $x_2'(t)$ is avoided, thereby ensuring that the coherence magnitude will be smaller than one. As will be obvious to those skilled in the art, such a transformation reduces the coherence and hence the condition number of the covariance matrix, thereby improving the misalignment. Of course, the use of this transformation is particularly advantageous when its influence is inaudible and does not have any deleterious effect on stereo perception. For this reason, it is preferable that the multiplier, α, be relatively small.

In one illustrative embodiment of U.S. Pat. No. 5,828,756, the non-linear functions $f_1$ and $f_2$ as applied by non-linear function module 32 are each half-wave rectifier functions, defined as:

$$f(x) = \frac{x+|x|}{2} = \begin{cases} x & \text{if } x > 0 \\ 0 & \text{otherwise} \end{cases} \qquad\text{(Eq. 11)}$$

In this case, the multiplier a of equation (Eq. 10) may advantageously be set to a value less than 0.5, and, preferably, to a value in the range 0.1 to 0.3.

The above-described solution proposed in U.S. Pat. No. 5,828,756 is a simple and efficient solution that overcomes the above-discussed problems by adding a small non-linearity into each channel. The distortion due to the non-linearity is hardly perceptible and does not affect the stereo effect, yet reduces interchannel coherence, thereby allowing reduction of misalignment to a low level. However, because the introduced distortion is so small (so as not to significantly affect sound quality), the echo cancellation algorithm must be very powerful in order to converge to a solution within a reasonably small period of time when conditions in the room change. A least mean squares (LMS) solution does not converge fast enough. A much more powerful algorithm is necessary in order to make the system illustrated in FIG. 2 work. Particularly, the solution of FIG. 2 has been fruitful only when combined with a two-channel fast recursive least-squares (FRLS) algorithm. However, a FRLS algorithm requires a high level of computational complexity and, therefore, a powerful processor to implement. Further, it is unstable and may diverge under certain conditions. Accordingly, the real-time implementation of this algorithm that is necessary in order to employ in a real world teleconferencing system is difficult to achieve.

SUMMARY OF THE INVENTION

The invention is a multiple channel teleconferencing system employing a stereophonic acoustic echo canceller that exploits the coherence between multiple channels. In accordance with the invention a small non-linearity is incorporated into each channel path between the microphone and the speaker and an efficient frequency domain adaptive algorithm is implemented in the echo canceler circuit. The frequency domain algorithm converges to a solution much more quickly, than, for instance, a time domain, FRLS, solution.

DETAILED DESCRIPTION OF THE INVENTION

Figure 4:
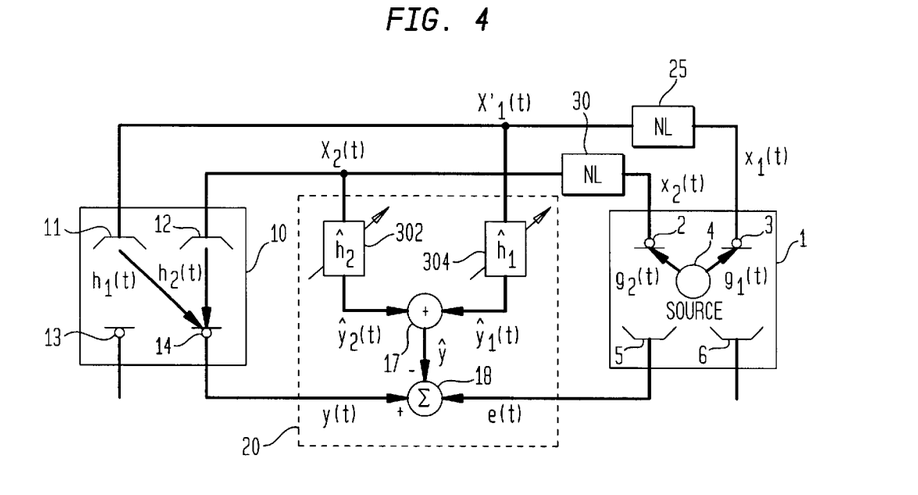
FIG. 4 is a schematic diagram in accordance with an illustrative embodiment of the present invention.

FIG. 4 is a schematic diagram of a stereophonic teleconferencing system in accordance with the present invention. It is essentially identical to FIG. 2 except for the fact that the adaptive filters 15 and 16 have been replaced with adaptive filters 302 and 304. As will be explained in detail below, adaptive filters 302 and 304 implement a frequency domain adaptive algorithm to track variations in the receiving room impulse responses $h_1$, $h_2$, respectively.

Due to the high correlation between the two channel signals, it is important to devise an adaptive algorithm that takes into account this correlation, or equivalently the coherence in the frequency domain, in order to speed up its convergence rate. In accordance with the present invention, a new frequency domain adaptive algorithm that converges to a low level misalignment and that is much less complex than the two-channel FRLS is disclosed.

I. The Extended LMS (ELMS) Algorithm

Extended least mean squares (ELMS) is a direct approximation of the RLS algorithm. The error signal at time n is given by $$e(n)=y(n)-\hat{y}_1(n)-\hat{y}_2(n), \quad \text{(Eq. 12)}$$

where $$\hat{y}_i(n)=\hat{h}_{iT}(n-1)x_i(n), i=1,2 \quad \text{(Eq. 13)}$$

with $$\hat{h}_i(n)=[\hat{h}_{0,i}(n)\hat{h}_{1,i}(n) \ldots \hat{h}_{L-1,i}(n)]^T$$

$$x_i(n)=[x_i(n)x_i(n-1) \ldots x_i(n-L+1)]^T$$

L is the length of the modeling filters. The two filters are updated as follows:

$$\hat{h}_1(n)=\hat{h}_1(n-1)+\mu r_1^{-1}[x_1(n)-\rho r_{1,2}r_{2,2}^{-1}x_2(n)]e(n) \quad \text{(Eq. 14)}$$

and $$\hat{h}_2(n)=\hat{h}_2(n-1)+\mu r_2^{-1}[x_2(n)-\rho r_{2,1}r_{1,1}^{-1}x_1(n)]e(n) \quad \text{(Eq. 15)}$$

with $$r_{i,j}(n)=x_i^T(n)x_j(n), i,j=1,2 \quad \text{(Eq. 16)}$$

and $$r_i(n)=r_{i,i}(n)[1-\rho^2 k^2(n)], i=1,2 \quad \text{(Eq. 17)}$$

where $$k(n) = \frac{r_{1,2}(n)}{\sqrt{r_{1,1}(n)r_{2,2}(n)}} \quad \text{(Eq. 18)}$$

is the cross-correlation coefficient. It should be understood by those skilled in the art that $\mu$ is the positive step size that controls the convergence of the adaptive algorithm, $r_{i,j}$ is the cross correlation coefficient for i,j (see Eq. 16), $r_i$ is the normalized correlation coefficient (see Eq. 17), and $\rho$ is a positive scalar that controls the level of cross correlation, and k is the cross correlation coefficient (see Eq. 18). Let us suppose in the following that $0<\mu<1$ and $0 \leq \rho \leq 1$. This algorithm is interesting because it introduces the cross-correlation coefficient between the two input signals and can be exploited to derive a frequency domain adaptive filter that takes into account the coherence function between the channels at different frequencies.

Block Version of the ELMS Algorithm

In this section, a block version of the ELMS is derived which will be the foundation of the frequency domain algorithm. Let N be an integer and assume that L is an integer multiple of N, i.e., L=KN. The block error of the ELMS is:

$$e(m)=y(m)-\hat{y}_1(m)-\hat{y}_1(m), \quad \text{(Eq. 19)}$$

where m is the block time index, and $$e(m)=[e(mN) \ldots e(mN+N-1]^T,$$

$$y(m)=[y(mN) \ldots y(mN+N-1]^T,$$

$$\hat{y}_j(m)=[x_j(mN) \ldots x_j(mN+N-1)]^T \hat{h}_i(m-1).$$

In accordance with J. S. Soo and K.K. Pang, "Multidelay Block Frequency Domain Adaptive Filter," *IEEE Trans. Acoust., Speech, Signal Processing*, vol. ASSP-38, pp. 373–376, February 1990 and J. Benesty and P. Duhamel, "Fast Constant Modulus Adaptive Algorithm," IEE Proc. -F, Special Issue on Adaptive Filters, pp. 379–387, August 1991, we can easily show that.

$$\hat{y}_j(m) = \sum_{i=o}^{K-1} T_{i,j}(m)\hat{h}_{i,j}(m-1), j=1,2 \quad \text{(Eq. 20)}$$

where $T_{i,j}(m)=$ $$\begin{bmatrix} x_j(mN-N_i) & \ldots & x_j(mN-N_i-N+1) \\ \ldots & \ldots & \ldots \\ x_j(mN-N_i+N-1) & \ldots & x_j(mN-N_i) \end{bmatrix}$$

is an (N×N) Toeplitz matrix and $$\hat{h}_{i,j}=[\hat{h}_{Ni,j}\hat{h}_{Ni+1,j},\ldots \hat{h}_{Ni+N-1,j}]^T,$$

$$i=0,1,\ldots,K-1, j=1,2,$$

are the sub-filters of $\hat{h}_1$ and $\hat{h}_2$. Let us assume for now that the coefficients $r_{i,j}$ are fixed, so that the filters are adapted according to $$\hat{h}_{i,1}(m)=\hat{h}_{i,1}(m-1)+\mu_b r_1^{-1}[T_{i,1}^T(m)-\rho r_{1,2} r_{2,2}^{-1} T_{i,2}^T(m)]e(m) \quad \text{(Eq. 21)}$$

and $$\hat{h}_{i,2}(m)=\hat{h}_{i,2}(m-1)+\mu_b r_2^{-1}[T_{i,2}^T(m)-\rho r_{2,1_{1,1}}^{-1} T_{i,1}^T(m)]e(m). \quad \text{(Eq. 22)}$$

From this formulation, the frequency domain adaptive algorithm is derived.

THE PROPOSED ALGORITHM

It is well know that a Toeplitz matrix T can be transformed, by doubling its size, to a circulant matrix.

$$C = \begin{bmatrix} T' & T \\ T & T' \end{bmatrix}$$

where T' is also a Toeplitz matrix. Herein the prime symbol, ', denotes a double size matrix. Using circulant matrices instead, the block ELMS can be re-written equivalently:

$$\begin{bmatrix} o_{N\times 1} \\ e(m) \end{bmatrix} = \begin{bmatrix} o_{N\times 1} \\ y(m) \end{bmatrix} - W[\hat{y}'_1(m) + \hat{y}'_2(m)], \quad \text{(Eq. 23)}$$

where $$W = \begin{bmatrix} o_{N\times N} & o_{N\times N} \\ o_{N\times N} & I_{N\times N} \end{bmatrix}, \quad \text{(Eq. 24)}$$

$$\hat{y}'_j(m) = \sum_{i=o}^{K-1} c_{i,j}(m) \begin{bmatrix} \hat{h}_{i,j}^{(m-1)} \\ \phi_{N\times 1} \end{bmatrix}, \quad j=1,2$$

$$c_{i,j}(m) = \begin{bmatrix} T'_{i,j}(m) & T_{i,j}(m) \\ T_{i,j}(m) & T_{i,j}(m) \end{bmatrix} \text{ and}$$

$$T'_{i,j}(m) = \begin{bmatrix} x_j(mN-Ni-N) & \ldots & x_j(mN-Ni+1) \\ \ldots & \ldots & \ldots \\ x_j(mN-Ni-1) & \ldots & x_j(mN-Ni-N) \end{bmatrix}$$

Adaptation:

$$\begin{bmatrix} \hat{h}_i 1(m) \\ o_{N\times 1} \end{bmatrix} = \begin{bmatrix} \hat{h}_{i,1}(m-1) \\ o_{N\times 1} \end{bmatrix} + \quad \text{(Eq. 25)}$$

$$\mu_b W_{r_1}^{-1}[c_{i,1}^T(m)-\rho r_{1,2} r_{2,2}^{-1} c_{i,2}^T(m)]\begin{bmatrix} o_{N\times 1} \\ e(m) \end{bmatrix}$$

$$\begin{bmatrix} \hat{h}_{i,2}(m) \\ o_{N\times 1} \end{bmatrix} = \begin{bmatrix} \hat{h}_{i,2}(m-1) \\ o_{N\times 1} \end{bmatrix} + \quad \text{(Eq. 26)}$$

$$\mu_b W_{r_2}^{-1}[c_{i,2}^T(m)-\rho r_{2,1} r_{1,1}^{-1} c_{i,1}^T(m)]\begin{bmatrix} o_{N\times 1} \\ e(m) \end{bmatrix}$$

It should be well-known to those of skill in the art that $O_{N\times N}$ denotes a 0 matrix of size N×N and $I_{N\times N}$ denotes an identity matrix of size N×N.

It is also well known that a circulant matrix is easily decomposed as follows: $C=F^{-1}DF$, where F is the Fourier matrix and D is a diagonal matrix whose elements are the Fourier transform of the first column of C. Using this decomposition and the following time shift relationship found in J. Benesty and P. Duhamel, "Fast constant modules adaptive algorithm," IEE Proc. -F, Special Issue on Adaptive Filters, pp. 379–387, August. 1991, incorporated herein by reference:

$$D_{i,j}(m)=D_{i-1,j}(m-1), i=1,2,\ldots,K, j=1,2 \quad \text{(Eq. 27)}$$

(where $D_{i,j}(m)=FC_{i,j}(m)F^{-1}$ yields an efficient frequency domain adaptive algorithm:

Filtering:

$$\hat{\underline{y}}_j(m) = \sum_{i=0}^{K-1} D_{0,j}(m-i)\hat{\underline{h}}_{i,j}(m-1), \ j=1,2 \quad \text{(Eq. 28)}$$

Error signal:

$$\underline{e}(m)=\underline{y}(m)-FWF^{-1}[\hat{\underline{y}}_1(m)+\hat{\underline{y}}_2(m)]. \quad \text{(Eq. 29)}$$

Adaptation:

$$\hat{\underline{h}}_{i,1}(m)=\hat{\underline{h}}_{i,1}(m-1)+\mu_b FWF^{-1}S_1^{-1}[D^*_{i,1}(m)-\rho S_{1,2}S_{2,2}^{-1}D^*_{i,2}(m)]$$
$$\underline{e}(m) \quad \text{(Eq. 30)}$$

and $$\hat{\underline{h}}_{i,2}(m)=\hat{\underline{h}}_{i,2}(m-1)+\mu_b FWF^{-1}S_2^{-1}[D^*_{i,2}(m)-\rho S_{2,1}S_{1,1}^{-1}D^*_{i,1}(m)]$$
$$\underline{e}(m) \quad \text{(Eq. 31)}$$

where the underscore symbol, , denotes the Fourier transform of the corresponding vector we have used the frequency domain quantities:

$$\hat{\underline{h}}_{i,j}(m) = F \begin{bmatrix} \hat{h}_{i,j}(m) \\ o_{N\times 1} \end{bmatrix},$$

$$\underline{e}(m) = F \begin{bmatrix} o_{N\times 1} \\ e(m) \end{bmatrix},$$

$$\underline{y}(m) = F \begin{bmatrix} o_{N\times 1} \\ y(m) \end{bmatrix},$$

It should be understood by those of skill in the art that $S_i$ denotes the power spectrum of signal $x_i$ and that the symbol $S_{i,j}$ denotes the cross power spectrum between $x_i$ and $x_j$. Note that, if $S_i=r_i I_{2N\times 2N}$ and $S_{i,j}=r_{i,j} I_{2N\times 2N}$, then this algorithm is strictly equivalent to the block ELMS. For $\rho=0$, we find the basic two-channel multi-delay frequency (MDF).

The advantage of this approach is that the coefficients of the diagonal matrices $S_i$, i=1,2, can be computed individually according to the power spectrum ($S_{i,i}$), cross-power spectrum ($S_{i,j}$), and coherence in the corresponding frequency bin. Hence:

$$S_{i,j}(m)=\beta S_{i,j}(m-1)+(1-\beta)D_{0,i}(m)D^*_{0,j}(m), \quad \text{(Eq. 32)}$$

i,j=1,2 and $$S_1(m)=S_{i,i}(m)[I_{2N\times 2N}-\rho^2 U(m)U(m)], \ i=1,2 \quad \text{(Eq. 33)}$$

where $\beta$ is a smoothing factor and defines a window that is used to estimate the power spectrum and cross power spectrum and $$U(m)=[S_{1,1}(m)S_{2,2}(m)]^{1/2}S_{1,2}(m) \quad \text{(Eq. 34)}$$

is the coherence matrix.

It is interesting to compare Eq. (33) and Eq. (17). This algorithm has a strong link to the two-channel RLS. There are much more sophisticated ways to estimate Eq. (32); one of them is to use the Welch method which gives very good results in practice with speech signals. J. S. Soo and K.K. Pang, "Multidelay Block Frequency Domain Adaptive Filter," *IEEE Trans. Acoust., Speech, Signal Processing*, vol. ASSP-38, pp. 373–376, February 1990.

ARITHMETIC COMPLEXITY:

Suppose that the block length N is a power of 2, i.e., $N=2^b$. Also assume that the FFT is computed using the split radix algorithm. P. Duhamel, "Implementation of Split-Radix FFT Algorithm for Complex, Real and Real-Symmetric Data," *IEEE Trans. Acoust., Speech, Signal Processing*, vol. ASSP-34, pp. 285–295, April 1986. The number of operations to be performed per output point for the proposed algorithm is roughly:

$4K(b+12)+4b$ real multiplications and $4K(3b+10)+12b$ real additions.

For example, with L=1024 and N=256, the computational cost of the proposed algorithm is about 8 times smaller than the two-channel NLMS.

The proposed algorithm can be generalized to the GMDFα of E. Moulines, O. Ait Amrane, and Y. Grenier, "The Generalized Multidelay Adaptive Filter: Structure and Convergence Analysis," *IEEE Trans. Signal Processing*, vol. 43, pp. 14–28, January 1995 and J. Prado and E. Moulines, "Frequency-Domain Adaptive Filtering with Applications to Acoustic Echo Cancellation." *Ann. Telecommun.*, vol. 49, pp. 414–428, 1994, where α is the overlapping factor. This structure is very useful in the context of adaptive filtering, since the filter coefficients are adapted more frequently (every M=N/α samples instead of every N samples). As a result, a faster convergence rate and better tracking are expected. However, the complexity is increased by a factor α. In the following simulations, such a structure was used. Of course, an unconstrained version also can be derived to reduce the complexity, D. Mansour and A. H. Gray, JR., "Unconstrained Frequency-Domain Adaptive Filter," *IEEE Trans. Acoust., Speech, Signal Processing*, vol. ASSP-30, pp. 726–734, October 1982.

Simulations

The following simulations show the effectiveness of the present invention and compare its results to the two-channel normalized LMS (NLMS) and to the two channel FRLS solutions. The signal source s in the transmission room is a 10 s speech signal. The two microphone signals were obtained by convolving s with two impulse response $g_1$, $g_2$ of length 4096 which were measured in an actual room. The microphone output signal y in the receiving room was obtained by summing the two convolutions ($h_1 * x_1$) and ($h_2 * x_2$), where $h_1$ and $h_2$ were also measured in an actual room as 4096 point responses. A white noise with 45 dB SNR was added to y. The sampling frequency rate was 16 kHz. The length of the two adaptive filters is taken as L=1024. In all of the simulations, a half wave rectifier nonlinearity (of amount 0.5) was added to the signals $x_1$ and $x_2$. For the proposed algorithm, the following parameters were chosen: N=1024, α=4, β=0.96, $\mu_b$=0.08, and ρ=0.99.

Figure 5A:
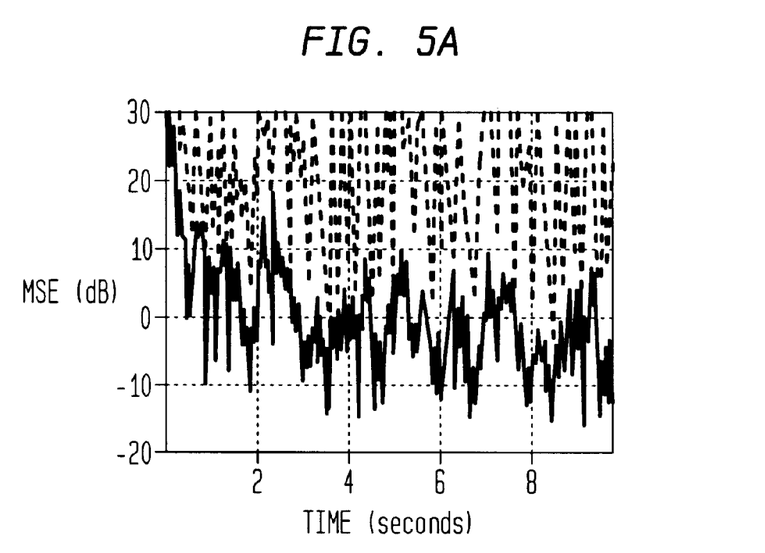
FIG. 5A is a graphical diagram illustrating convergence of the mean square error (MSE) of a stereophonic teleconferencing system in accordance with a first embodiment of the present invention utilizing a constrained algorithm.
Figure 5B:
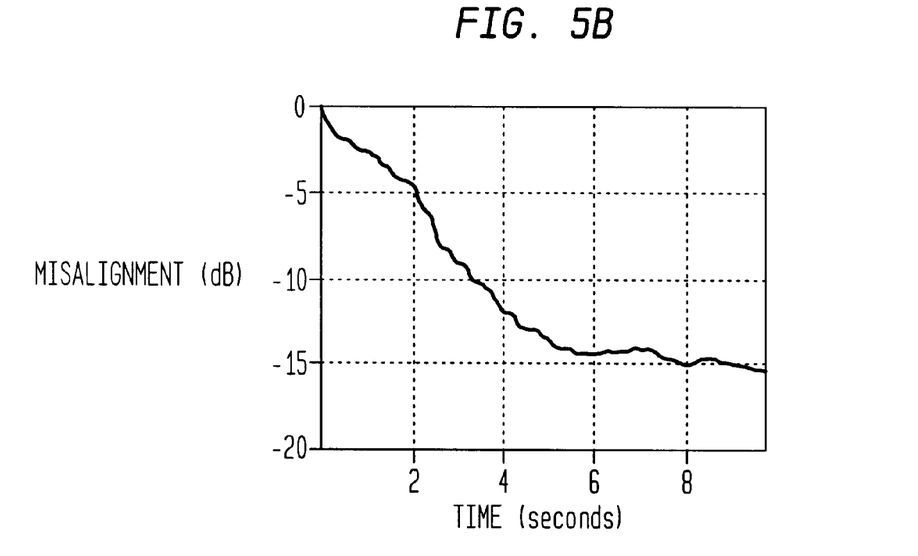
FIG. 5B is a graphical diagram illustrating misalignment in a stereophonic teleconferencing system employing echo cancellation in accordance with the first embodiment of the present invention utilizing a constrained algorithm.
Figure 6A:
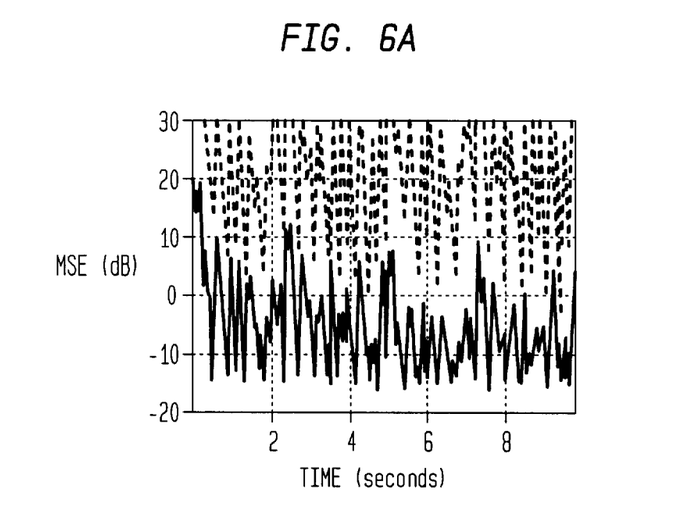
FIG. 6A is a graphical diagram illustrating convergence of the mean square error (MSE) of a stereophonic teleconferencing system in accordance with a normalized least mean-squares (NLMS) echo cancellation algorithm of the prior art.
Figure 6B:
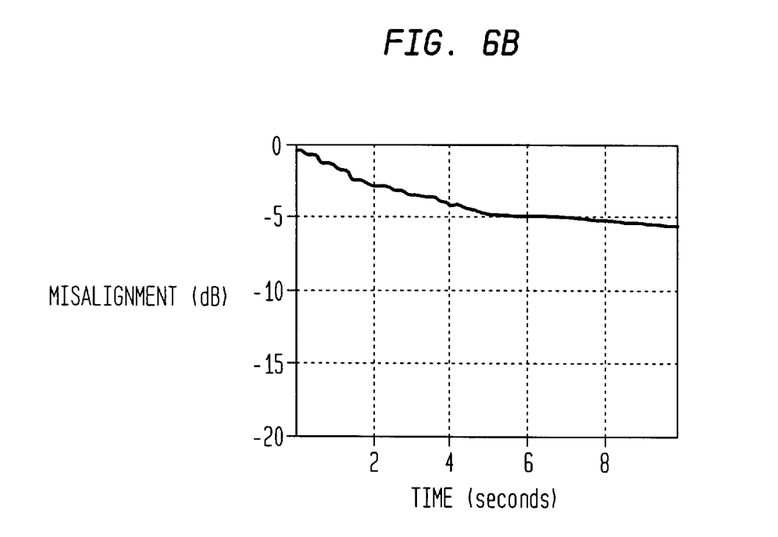
FIG. 6B is a graphical diagram illustrating misalignment in a stereophonic teleconferencing system employing echo cancellation in accordance with an NLMS echo cancellation algorithm of the prior art.
Figure 7A:
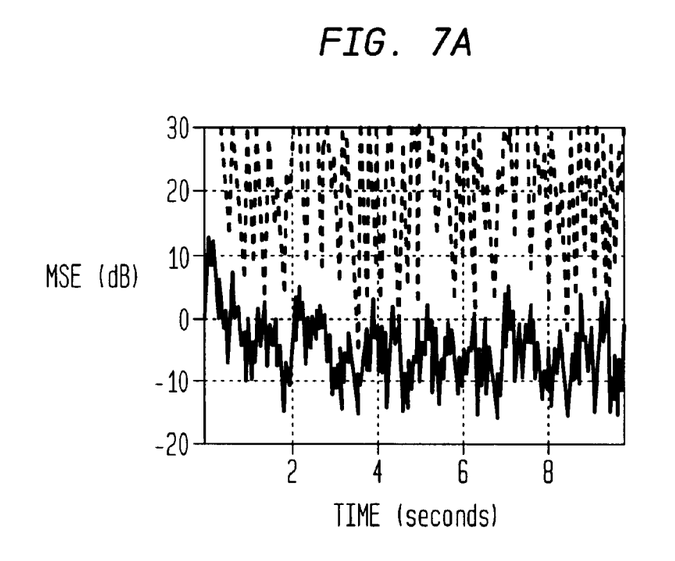
FIG. 7A is a graphical diagram illustrating convergence of the mean square error (MSE) of a stereophonic teleconferencing system in accordance with an FLRS echo cancellation algorithm of the prior art.
Figure 7B:
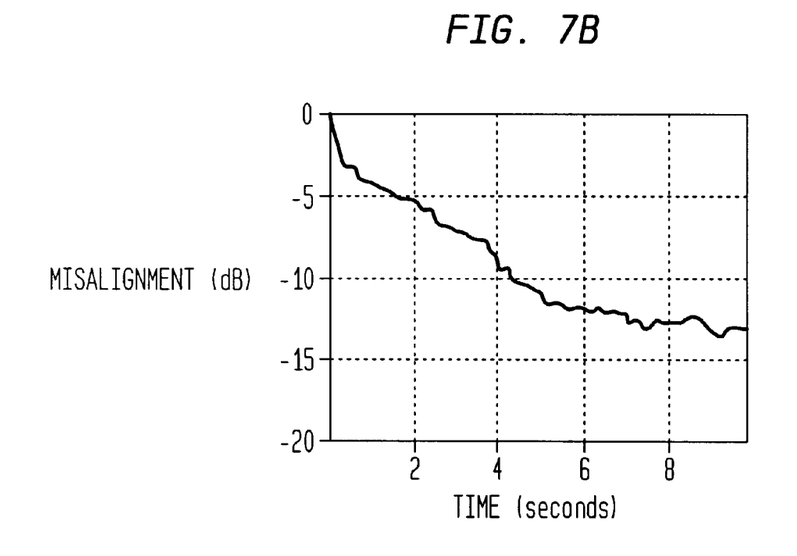
FIG. 7B is a graphical diagram illustrating misalignment in a stereophonic teleconferencing system employing echo cancellation in accordance with an FRLS echo cancellation algorithm of the prior art.

With these values of N and α, the proposed algorithm is 5 times less complex than the two-channel NLMS and 35 times less complex than the two-channel FRLS. FIGS. 5A, 6A and 7A show the convergence of the mean square error (MSE) for a constrained version of the newly proposed algorithm, a two-channel NLMS algorithm and a two-channel FRLS algorithm, respectively. FIGS. 5B, 6B and 7B show the misalignment for the same three cases, respectively. For the purpose of smoothing the curves, error and misalignment samples were averaged over 128 points. It is apparent that the present invention outperforms, as far as the misalignment is concerned, the two others. However, the MSE of the new algorithm is slightly worse than the NLMS MSE. This is because the proposed algorithm converges to the true solution (and to have more attenuation, one need only increase the length of the filters), while the priority of the NLMS is to minimize MSE. However, to the ear, the levels of the two residual echoes sound the same with less distortion for the present invention.

Figure 8A:
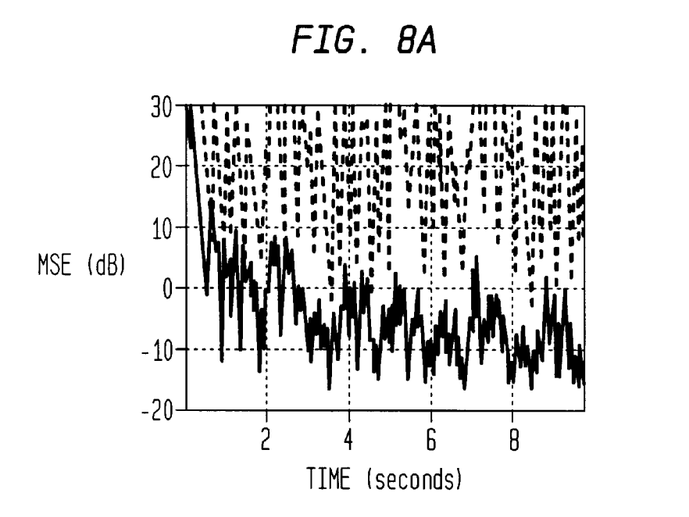
FIG. 8A is a graphical diagram illustrating convergence of the mean square error (MSE) of a stereophonic teleconferencing system employing a second embodiment of the present invention utilizing an unconstrained algorithm.
Figure 8B:
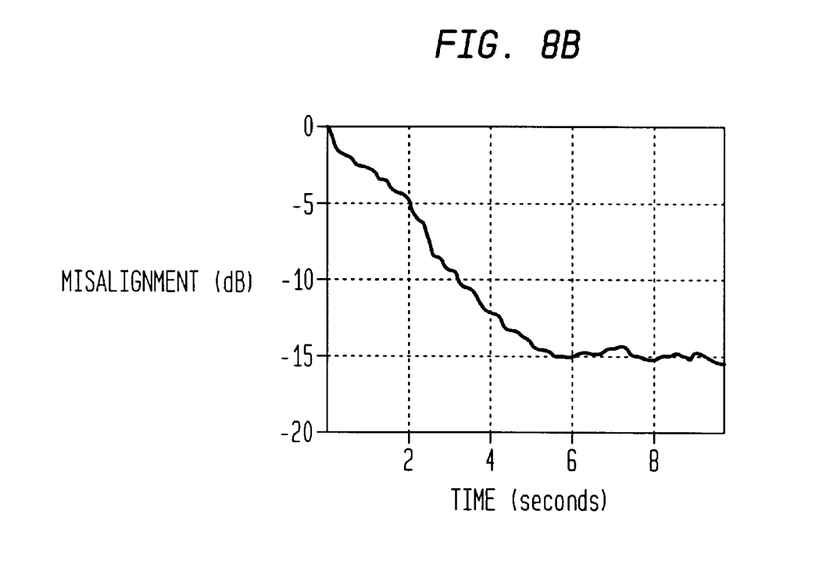
FIG. 8B is a graphical diagram illustrating misalignment in a stereophonic teleconferencing system employing echo cancellation in accordance with the second embodiment of the present invention utilizing an unconstrained algorithm.

FIGS. 8A and 8B show the convergence of the MSE and misalignment, respectively, of the unconstrained version of the proposed algorithm (which is much less complex than the constrained one). Here the attenuation of the MSE is as good as the one obtained with the FRLS and better than NLMS.

Conclusions

A new and efficient frequency domain adaptive algorithm exploiting the coherence between the input channels to reduce the detrimental effect of their correlation has been presented. The low complexity and the good behavior of the proposed algorithm will probably make it a very good candidate for stereophonic and, more generally, multichannel acoustic echo cancellation.

For clarity of explanation, the illustrative embodiments of the present invention described herein we presented as comprising individual functional blocks. The functions that these blocks represent may be provided through the use of either shared or dedicated hardware, including, but not limited to, hardware capable of executing software. For example, the functions of the blocks presented in the various illustrative figures may be provided by a single shared processor. (Use of the term "processor" should not be construed to refer exclusively to hardware capable of executing software.) Illustrative embodiments may comprise digital signal processor (DSP) hardware, read-only memory (ROM) for storing software performing the operations discussed above, and random access memory (RAM) for storing DSP results. Very large scale integration (VLSI) hardware embodiments, as well as custom VLSI circuitry in combination with a general purpose DSP circuit, may also be provided.

While each of the illustrative embodiments discussed herein has two channels, it will be obvious to those skilled in the art that the invention may be easily adapted to handle any plural number of channels.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of multi-channel teleconferencing between at least first and second locations, said method comprising the steps of:

transmitting multiple channels of sound upstream from said first location to said second location;

transmitting at least one additional channel of sound downstream from said second location to said first location;

introducing a non-linear transformation into each of one or more of said upstream multiple channels;

generating an estimate of an impulse response corresponding to echo paths at said second location coupled between each of said multiple upstream channels and said downstream channel;

generating an error signal representing the difference between a signal on said downstream channel representing sound at said second location and said estimate and transmitting said error signal to said first location;

wherein said estimate is generated using a frequency domain based adaptive algorithm.

2. The method as set forth in claim 1 wherein said frequency domain based adaptive algorithm is a Fourier transform based algorithm.

3. The method as set forth in claim 1 wherein said step of generating said estimate comprises the steps of:

developing an impulse response corresponding to each of said upstream channels that models an echo path at said second location from said corresponding upstream channel to said downstream channel;

convolving each of said impulse responses with a signal on the corresponding one of said upstream channels to generate an estimate for each individual one of said upstream channels; and summing each of said individual estimates.

4. The method as set forth in claim 3 wherein said multiple upstream channels comprise a first channel (1) and a second channel (2).

5. The method as set forth in claim 4 wherein:

$$\hat{\underline{h}}_{i,1}(m) = \hat{\underline{h}}_{i,1}(m-1) + \mu_b F W F^{-1} S_1^{-1} [D^*_{i,1}(m) - \rho S_{1,2} S_{2,2}^{-1} D^*_{i,2}(m)] \underline{e}(m)$$

and $$\hat{\underline{h}}_{i,2}(m) = \hat{\underline{h}}_{i,2}(m-1) + \mu_b F W F^{-1} S_2^{-1} [D^*_{i,2}(m) - \rho S_{2,1} S_{1,1}^{-1} D^*_{i,1}(m)] \underline{e}(m)$$

where $\underline{h}$ is said impulse response corresponding to said first upstream channel, $\underline{h}$ is said impulse response corresponding to said second upstream channel and e is said error signal.

6. The method as set forth in claim 5 wherein:

$$\underline{e}(m) = \underline{y}(m) - F W F^{-1} [\hat{\underline{y}}_1(m) + \hat{\underline{y}}_2(m)].$$

where y(m) is a signal on said downstream channel, $\underline{y}$ is said individual estimate corresponding to said first one of said multiple channels, and $\underline{y}$ is said individual estimate corresponding to said second one of said multiple channels.

7. A method of canceling acoustic echo in a teleconferencing system having multiple transmission channels from a first location to a second location and at least one transmission channel from said second location to said first location, said method comprising the steps of:

developing an impulse response corresponding to each of said multiple upstream channels that models an echo path at said second location from said corresponding upstream channel to said downstream channel;

convolving each of said impulse responses with a signal on the corresponding one of said upstream channels to generate an estimate corresponding each of said upstream channels; and summing each of said individual estimates;

wherein said estimate is generated using a frequency domain based adaptive algorithm.

8. The method as set forth in claim 7 wherein said frequency domain based adaptive algorithm is a Fourier transform based algorithm.

9. The method as set forth in claim 8 wherein said multiple upstream channels comprise a first channel (1) and a second channel (2).

10. The method as set forth in claim 9 wherein:

$$\hat{\underline{h}}_{i,1}(m) = \hat{\underline{h}}_{i,1}(m-1) + \mu_b F W F^{-1} S_1^{-1} [D^*_{i,1}(m) - \rho S_{1,2} S_{2,2}^{-1} D^*_{i,2}(m)] \underline{e}(m)$$

and $$\hat{\underline{h}}_{i,2}(m) = \hat{\underline{h}}_{i,2}(m-1) + \mu_b F W F^{-1} S_2^{-1} [D^*_{i,2}(m) - \rho S_{2,1} S_{1,1}^{-1} D^*_{i,1}(m)] \underline{e}(m)$$

where $\underline{h}$ is said impulse response corresponding to said first upstream channel, $\underline{h}$ is said impulse response corresponding to said second upstream channel and e is said error signal.

11. The method as set forth in claim 10 wherein:

$$\underline{e}(m) = \underline{y}(m) - F W F^{-1} [\hat{\underline{y}}_1(m) + \hat{\underline{y}}_2(m)].$$

where y(m) is a signal on said downstream channel, $\underline{y}$ is said individual estimate corresponding to said first one of said multiple channels, and $\underline{y}$ is said individual estimate corresponding to said second one of said multiple channels.

12. A multi-channel teleconferencing system comprising:

at least first and second upstream electrical paths between a first location and a second location for transmitting acoustic signals from said first location to said second location;

at least one downstream electrical path between said second location and said first location for transmitting acoustic signals from said second location to said first location;

at least one non-linear transformation module coupled within each of one or more of said upstream paths;

a finite impulse response filter coupled between said upstream paths and said downstream path for generating an estimate of an impulse response corresponding to echo paths at said second location coupled between each of said multiple upstream channels and said downstream channel, said estimate being generated using a frequency domain adaptive algorithm; and a difference circuit for generating an error signal representing the difference between a signal on said downstream channel representing sound at said second location and said estimate.

13. The apparatus as set forth in claim 12 wherein said frequency domain based adaptive algorithm is a Fourier transform based algorithm.

14. The apparatus as set forth in claim 12 wherein said finite impulse response circuit comprises:

a finite impulse response circuit corresponding to each of said upstream channels for generating an impulse response that models an impulse response corresponding to an echo path at said second location from said corresponding upstream channel to said downstream channel, each finite impulse response filter coupled between said corresponding upstream path and said downstream path.

15. The apparatus as set forth in claim 14 further comprising:

a summing circuit for summing said estimates; and a difference circuit coupled between said summer and said downstream path for generating an error signal comprising the difference between a signal on said downstream path representing sound at said second location and said estimates.

16. The apparatus as set forth in claim 15 wherein:

$$\hat{\underline{h}}_{i,1}(m)=\hat{\underline{h}}_{i,1}(m-1)+\mu_b FWF^{-1}S_1^{-1}[D^*_{i,1}(m)-\rho S_{1,2}S_{2,2}^{-1}D^*_{i,2}(m)]\underline{e}(m)$$

and $$\hat{\underline{h}}_{i,2}(m)=\hat{\underline{h}}_{i,2}(m-1)+\mu_b FWF^{-1}S_2^{-1}[D^*_{i,2}(m)-\rho S_{2,1}S_{1,1}^{-1}D^*_{i,1}(m)]\underline{e}(m)$$

where $\underline{h}$ is said impulse response of said finite impulse response filter corresponding to said first upstream channel, $\underline{h}$ is said impulse response of said finite impulse response filter corresponding to said second upstream channel and e is said error signal.

17. The apparatus as set forth in claim 16 wherein:

$$\hat{e}(m)=\underline{y}(m)-FWF^{-1}[\hat{\underline{y}}_1(m)+\hat{\underline{y}}_2(m)+].$$

where y(m) is said signal on said downstream channel, $\underline{y}$ is said estimate corresponding to said first upstream channel and $\underline{y}$ is said estimate corresponding to said second upstream channel.

18. The apparatus as set forth in claim 12 further comprising;
    at least first and second microphones at said first location for receiving sound, said microphones coupled to said first and second electrical paths, respectively;
    at least first and second speakers at said second location coupled to said first and second electrical paths, respectively, for re-creating said sound from said first location at said second location;
    at least a third microphones at said second location for receiving sound, said microphone coupled to said downstream electrical path;
    at least a third speaker at said first location coupled to said downstream electrical path for re-creating said sound from said second location at said first location.

19. An apparatus for performing echo cancellation in a multi-channel teleconferencing system comprising at least first and second upstream electrical paths between a first location and a second location for transmitting acoustic signals from said first location to said second location and at least one downstream electrical path between said second location and said first location for transmitting acoustic signals from said second location to said first location, said apparatus comprising;
    at least one non-linear transformation module for coupling within each of one or more of said upstream paths;
    a finite impulse response filter for coupling between said upstream paths and said downstream path for generating an estimate of an impulse response corresponding to echo paths at said second location coupled between each of said multiple upstream channels and said downstream channel, said estimate being generated using a frequency domain adaptive algorithm.

20. The apparatus as set forth in claim 19 further comprising:
    a difference circuit coupled to an output of said finite impulse response circuit for coupling to said downstream path for generating an error signal representing the difference between a signal on said downstream path representing sound at said second location and said estimate.

21. The apparatus as set forth in claim 20 wherein said frequency domain adaptive algorithm is a Fourier transform based algorithm.

22. The apparatus as set forth in claim 20 wherein said finite impulse response circuit comprises:
    multiple finite impulse response circuits for each of said upstream channels for generating an impulse response that models an impulse response corresponding to an echo path at said second location from said corresponding upstream channel to said downstream channel.

23. The apparatus as set forth in claim 22 further comprising:
    a summing circuit for summing said estimates from each of said multiple finite impulse response circuits; and
    a difference circuit for coupling between said summer and said downstream path for generating an error signal comprising the difference between a signal on said downstream path representing sound at said second location and said estimates.

24. The apparatus as set forth in claim 22 wherein:

$$\hat{\underline{h}}_{i,1}(m)=\hat{\underline{h}}_{i,1}(m-1)+\mu_b FWF^{-1}S_1^{-1}[D^*_{i,1}(m)-\rho S_{1,2}S_{2,2}^{-1}D^*_{i,2}(m)]\underline{e}(m)$$

and $$\hat{\underline{h}}_{i,2}(m)=\hat{\underline{h}}_{i,2}(m-1)+\mu_b FWF^{-1}S_2^{-1}[D^*_{i,2}(m)-\rho S_{2,1}S_{1,1}^{-1}D^*_{i,1}(m)]\underline{e}(m)$$

where $\underline{h}$ is said impulse response of said finite impulse response filter corresponding to said first upstream channel, $\underline{h}$ is said impulse response of said finite impulse response filter corresponding to said second upstream channel and e is said error signal.

25. The apparatus as set forth in claim 24 wherein:

$$\underline{e}(m)=\underline{y}(m)-FWF^{-1}[\hat{\underline{y}}_1(m)+\hat{\underline{y}}_2(m)+].$$

where y(m) is said signal on said downstream channel, $\underline{y}$ is said estimate corresponding to said first upstream channel and $\underline{y}$ is said estimate corresponding to said second upstream channel.

* * * * *